May 5, 1936.  W. B. MOORE  2,039,548

METHOD OF DECORATING ENAMELED WARE

Filed May 11, 1935  3 Sheets-Sheet 1

INVENTOR.
Walter B. Moore.
BY
ATTORNEYS.

May 5, 1936.  W. B. MOORE  2,039,548
METHOD OF DECORATING ENAMELED WARE
Filed May 11, 1935   3 Sheets-Sheet 2

INVENTOR.
Walter B. Moore.
BY
ATTORNEYS.

May 5, 1936.  W. B. MOORE  2,039,548

METHOD OF DECORATING ENAMELED WARE

Filed May 11, 1935　　3 Sheets-Sheet 3

INVENTOR.
Walter B. Moore.
BY
ATTORNEYS.

Patented May 5, 1936

2,039,548

UNITED STATES PATENT OFFICE 2,039,548

METHOD OF DECORATING ENAMELED WARE

Walter B. Moore, West Lafayette, Ohio, assignor to The Moore Enameling and Manufacturing Company, West Lafayette, Ohio, a corporation of Ohio Application May 11, 1935, Serial No. 21,059

5 Claims. (Cl. 41—26)

My invention relates to a method of decorating enameled ware. It has to do, more particularly, with a method of decorating ware by applying enamel thereto in such a manner as to produce an ornamented surface thereon which has the appearance of natural marble.

There have been a number of methods employed in the past in decorating enameled ware. It has been claimed that some of these methods produce an ornamented surface on enameled ware which has the appearance of marble. However, although the ornamented surfaces produced by these prior art methods have consisted of two or more colors of enamel applied in such a manner as to produce a variegated or irregular effect, these surfaces have not actually had the appearance of natural marble.

One method employed for producing what is termed a "marbleized" effect, but which actually does not resemble marble, has comprised the steps of first properly preparing the steel ware and then dipping the ware into a ground coat of enamel. The ware is then fired to vitrify the ground coat. The ware is again dipped in an enamel of light color and the excess is shaken off, obtaining a coating of enamel of uniform thickness. Then an enamel of darker color is dashed on the base coat, which is still wet, by using a brush or paddle for this purpose. In dashing the enamel of darker color on that of the lighter color, a multitude of drops of the darker enamel are formed on the lighter base coat. The ware is then shaken so that the multitude of drops are leveled down to some extent and are somewhat elongated. An irregular or variegated effect is thus obtained, but the surface produced does not resemble natural marble, although this is the purpose in decorating it. The ware is then fired to vitrify the enamel. Dashing the enamel of darker color on the base coat produces a large percentage of uneven surface. Furthermore, it requires an excessive amount of enamel of the darker color.

Another method employed for decorating enameled ware is substantially the same as the above method with the exception that the second enamel is sprayed on the base coat instead of being dashed thereon with a brush or paddle. However, with this method a multitude of small drops are obtained which cannot be elongated to any considerable extent by shaking. Consequently, a speckled effect is obtained. Also, irregular surfaces are obtained since when the enamel is sprayed on the wet base coat, the drops strike the base coat with considerable force and form pits therein. Furthermore, the speckled surface produced does not in the least resemble natural marble.

Another method employed for decorating enameled ware produces what is commonly termed a "mottled" surface. According to this method, steel ware is coated with an enamel which has certain chemicals therein that will act on the steel to oxidate it. The enamel is applied to the steel and as it dries the chemicals act therewith to oxidate the steel, and the oxidation induced by the chemicals causes iron oxide to be produced which will cause portions of the enamel to burn dark when fired. Thus, if a light color is used, when the ware is fired a "mottled" effect will be produced. However, this mottled effect in no way resembles marble. The ornamented surface produced is of uniform character throughout. Also, only light colors can be used in this process since the iron oxide will not have any effect on the appearance of the enamel unless it is of light color. Furthermore, it requires considerable time for the enamel to dry and the chemical action to take place which is necessary before the ware can be fired.

One of the objects of my invention is to provide a method for decorating or ornamenting enameled ware which is of such a nature that the surface produced on the enameled ware will have the appearance of natural marble.

Another object of my invention is to provide a method of the type indicated which can be easily, quickly and efficiently performed and which may be performed in an economical manner.

Another object of my invention is to provide an article which is ornamented in such a manner that it has the appearance of natural marble and is much more pleasing in appearance and entirely different in appearance from any ornamented enamel ware produced by prior art methods.

In its preferred form my invention comprises the steps of first preparing the metal ware to receive the base coat by treating the ware in the usual manner. Then the ware is dipped into enamel which is to form the base coat. The ware is then shaken to shake off the excess enamel and to spread it evenly over the entire surface thereof. The next step is to apply an enamel of a contrasting color to the base coat of enamel which is still wet. This is accomplished by flowing the enamel of contrasting color in widely separated streams on the wet base coat. The base coat and the enamel of contrasting color are preferably of substantially the same fluidity. When the second enamel is applied to the base coat it will intermingle with the base coat but will still be distinguishable therefrom and will be in the form of separated streaks. The article is then subjected to an oscillating motion or an up-and-down motion, or both, which causes both the base coat and the enamel of contrasting color to move simultaneously. This will cause the streaks of enamel of contrasting color to become irregular. Thus, the surface produced will resemble marble wherein there is a base color and irregular streaks of a contrasting color, which are spaced apart. The ware is then preferably immediately dried and is then fired to vitrify the enamel thereon.

In the accompanying drawings I have illustrated how my method is preferably carried out. In these drawings like characters of reference designate corresponding elements and;

With reference to the drawings, I have illustrated apparatus which may be used in carrying out my method. However, it is to be understood that other apparatus may be employed.

Figure 1:
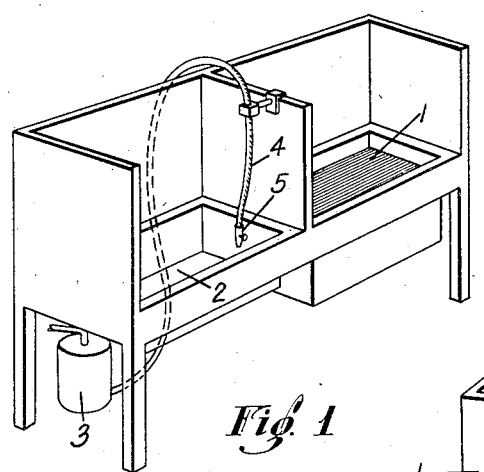
Figure 1 illustrates apparatus which may be used in performing my method.

In Figure 1 I show a structure which includes a tank 1 which contains the enamel adapted to form the base coat and into which an article may be dipped. I also show a pan 2 disposed adjacent thereto which is adapted to receive any enamel which might drop off the article during the application thereto of the enamel of contrasting color. I also show a tank 3 which is adapted to contain the enamel of the contrasting color and which has a flexible hose 4 connected thereto. The hose has a valved nozzle 5 on its outer end. The enamel in the tank 3 will be under pressure and will flow from the nozzle when the valve therein is open to permit this. The enamel in the tanks 1 and 3 may be prepared in any suitable way. They are preferably of contrasting colors. Also, they are preferably of substantially the same viscosity or fluidity. They are of such fluidity that they will move sufficiently when applied to the article and when the article is shaken, as will be described later.

Figure 2:
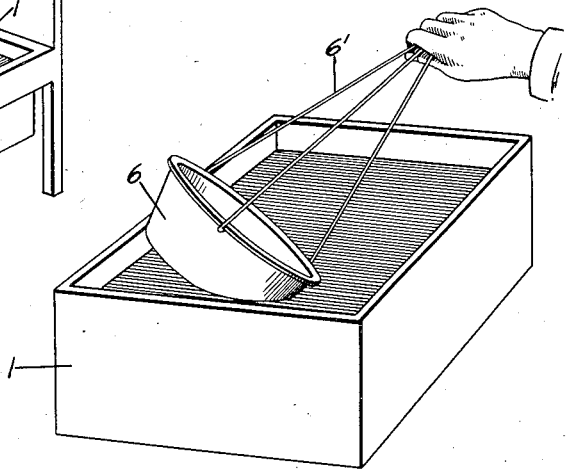
Figure 2 illustrates the first step of my method which consists in dipping an article of ware in enamel which is to form the base coat.
Figure 3:
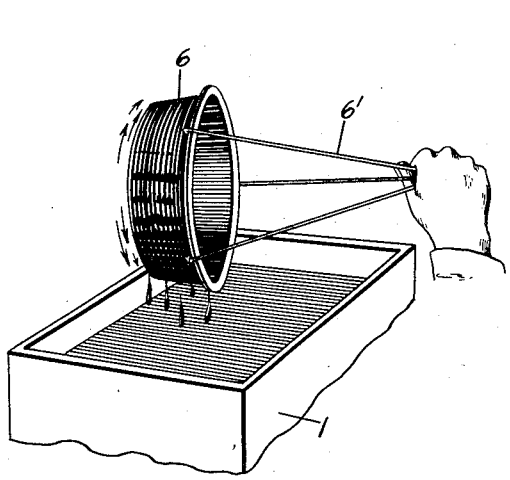
Figure 3 shows the article being removed from the enamel in which it is dipped.
Figure 4:
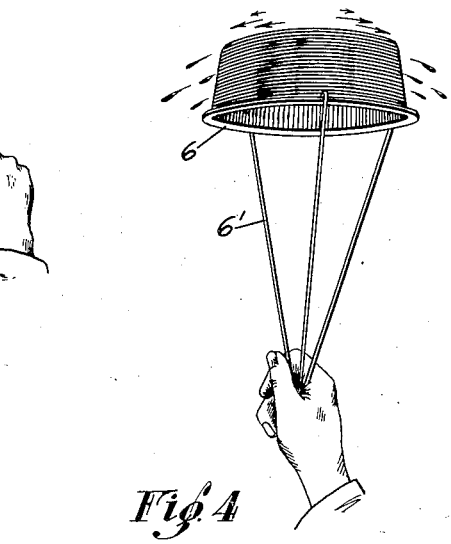
Figure 4 is a view showing how the article may be shaken to remove the excess enamel.

In performing my method I first take an article 6 and grip it with tongs 6' as illustrated in Figure 2. Then the article is dipped in the enamel in the tank 1. It is then removed as illustrated in Figure 3 and will have a thick coating of the base coat adhering thereon. The enamel that forms the base coat is preferably comparatively thick although it is sufficiently fluid to permit movement or running thereof when the article is shaken. The article is then shaken as illustrated in Figure 4 to remove any excess base coat enamel and to cause the enamel to spread evenly over the entire article. The article is preferably oscillated by turning the tongs back and forth as illustrated.

Figure 5:
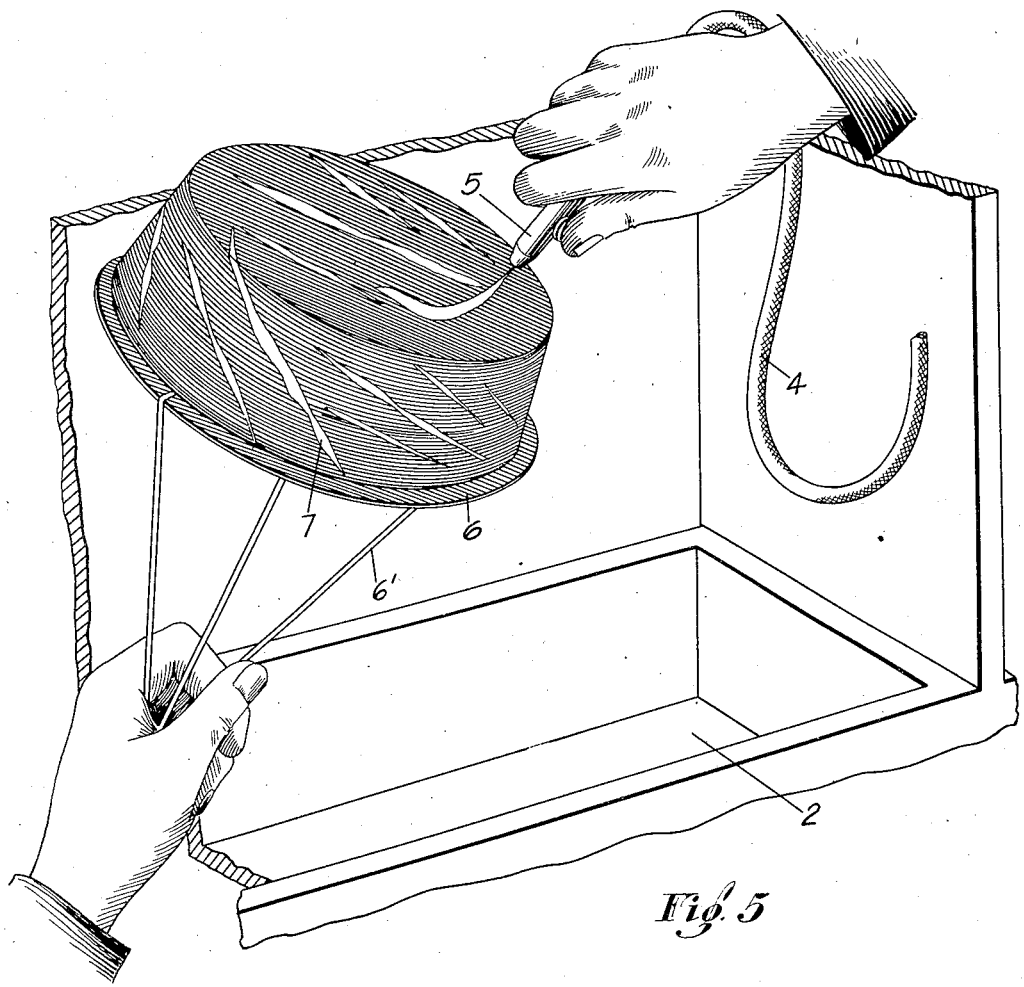
Figure 5 illustrates how the streaks of enamel of contrasting color are applied to the article.
Figure 6:
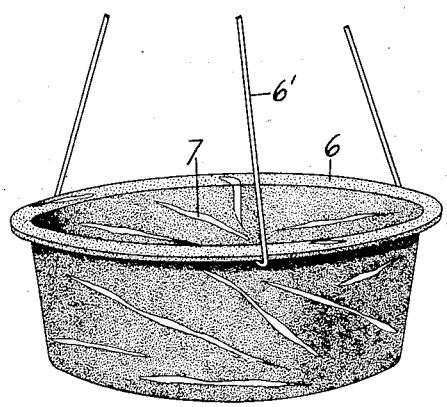
Figure 6 shows the article after the enamel of contrasting color has been applied thereto in the form of separated streaks.

The next step is illustrated in Figure 5 and consists in applying the enamel of contrasting color to the base coat. The enamel of contrasting color is applied to the base coat while it is still wet. It is applied by controlling the valve in the nozzle 5 to permit the enamel to flow therefrom onto the article. The enamel of contrasting color is applied to the base coat in the form of widely separated streams or streaks 7, as indicated in Figure 5. The enamel of contrasting color may be flowed in streams on the article in such a manner that the streaks will be straight or will be curved or zigzagged. The enamel is flowed from the nozzle in such a manner that it is permitted to gently settle on the base coat. As previously stated, it is preferably of substantially the same viscosity or fluidity as the base coat. Thus, when it is applied thereto in the form of streams, they will settle in the base coat but will still be clearly distinguishable and will be in the form of streaks of a contrasting color. At this time, the article will have much the appearance of that illustrated in Figure 6.

Figure 7:
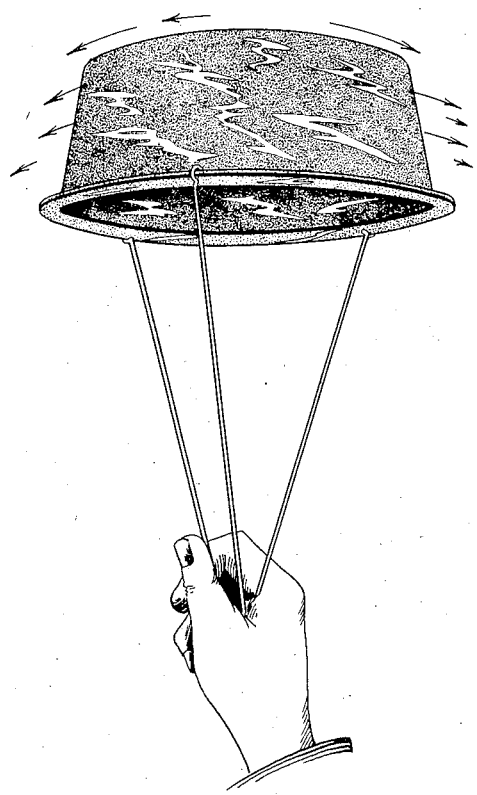
Figure 7 is a view illustrating how the article is subjected to an oscillating motion to make the streaks of the enamel of contrasting color irregular.
Figure 8:
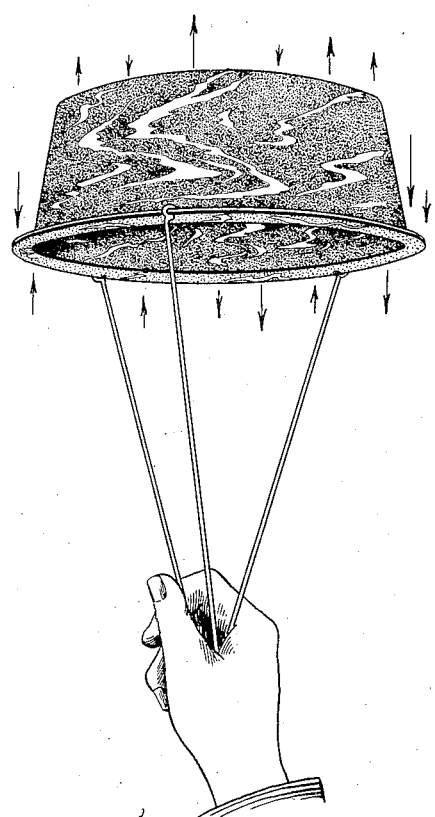
Figure 8 is a view illustrating how the article may be moved up and down to cause the streaks to become more irregular.

The next step is to shake the article in such a manner that the separated streaks 7 of the enamel of contrasting color will become irregular in outline so as to resemble the streaks of contrasting color appearing in natural marble. As previously stated, both enamels are of such fluidity that when the article is shaken they will both move relative to the metal surface of the article. Therefore, as illustrated in Figure 7, the article is first oscillated by turning the tongs in such a manner as to cause the article to first rotate in a clockwise direction and then in a counterclockwise direction. However, this oscillation is preferably carried on in such a manner that the article never moves through a distance equal to or more than its circumference. Also, the back-and-forth movement or oscillation is preferably carried on at a high rate of speed. If desirable, the article may then be quickly moved up and down as indicated by the arrows in Figure 8. These movements cause the streaks of enamel of contrasting color to be elongated and also to be widened in certain portions. It also causes the streaks to become irregular or zigzag in outline. When the article is shaken or oscillated, both of the enamels move together, since they are of substantially the same fluidity. However, they are of sufficient viscosity to prevent them from moving too greatly.

The article is then ready to be dried. The drying may be induced gradually through a continuous drying chamber in from 6 to 8 minutes. Or the article may be dried by permitting it to remain in a room for approximately one hour. After the article is dried it is then fired at a temperature of from 1450° to 1750° F. which will cause the enamel to vitrify.

Figure 9:
Figure 9 is a perspective view of an article produced according to my method which has the surface thereof ornamented in such a manner that it closely resembles natural marble.

The article produced will have somewhat the appearance of that illustrated in Figure 9. It will be apparent from this figure that the base coat is clearly distinguishable and that the streaks of the enamel of contrasting color are also clearly distinguishable. The streaks are very irregular and are spaced apart, in most instances, so that the net result is an ornamented surface which has the appearance of natural marble.

Although in the above description I have stated that enamel of one contrasting color is applied to the base coat, it will be apparent that enamels of two or more contrasting colors may be applied thereto. These enamels of contrasting colors will be applied in the form of separated streams, as before. The base coat may be light or it may be dark. Furthermore, although it is ordinarily not necessary to use a ground coat before the base coat is applied to the article, a ground coat may be used if desired.

One of the important features of my invention is the fact that the enamel of contrasting color is applied to the base coat in the form of elongated streams which are permitted to gently flow and settle on the base coat. This enamel will therefore merely settle or intermingle with the enamel of the base coat, the entire coating of enamel of both colors forming a single even layer. Also, when the article is shaken subsequently, since elongated streams are originally applied to the base coat, the streaks produced in the finished article will be elongated, although irregular, and will resemble the streaks in natural marble.

It will be apparent from the above description that I have provided a method for decorating or ornamenting enameled ware which is of such a nature that the surface produced on the enameled ware will have the appearance of natural marble. This method is of such a nature that it can be easily, quickly and efficiently performed in an economical manner. Much less enamel of the contrasting color will be required than with prior art methods since only a very small proportion of the surface will be covered by the streaks of contrasting color. The article produced is ornamented in such a manner that it has the appearance of natural marble and is much more pleasing in appearance and entirely different in appearance from any ornamented enamel ware produced by prior art methods.

By the term "enamel" used in the above description and the following claims, I also intend to cover paint and other similar substances.

Many other advantages will be apparent from the drawings and the preceding description.

Having thus described my invention, what I claim is:

1. The method of decorating enameled ware which comprises applying a base coat of enamel of a selected color to the article to be decorated, flowing streams of enamel of a contrasting color upon the base coat while still wet to form separated streaks, and then shaking the article to cause the streaks of enamel of contrasting color and the base coat to move together so that the streaks will become irregular.

2. The method of decorating enameled ware which comprises applying a base coat of vitrifiable enamel of a selected color to the article to be decorated, flowing separated streams of vitrifiable enamel of a contrasting color upon the base coat while it is still wet to form separated streaks of a contrasting color in the base coat, then shaking the article to cause the streaks of enamel of contrasting color and the base coat to move together so that the streaks will become irregular, and then drying and firing the article.

3. The method of decorating enameled ware which comprises applying a base coat of vitrifiable enamel of a selected color and of a predetermined viscosity to the article to be decorated, flowing separated streams of vitrifiable enamel of a contrasting color and of substantially the same viscosity upon the base coat while it is still wet to form separated streaks of a contrasting color in the base coat, then shaking the article to cause the streaks of enamel of contrasting color and the base coat to move together so that the streaks will become irregular, and then drying and firing the article.

4. The method of decorating enameled ware which comprises dipping the article in vitrifiable enamel of a selected color to form the base coat, shaking the article to remove the excess enamel therefrom, flowing separated streams of vitrifiable enamel of a contrasting color over the base coat and allowing the streams to gently settle thereon so as to form separated streaks of a contrasting color in the base coat, oscillating the article by quickly rotating it first in one direction and then the other in order to cause the base coat and the streaks of enamel of contrasting color to move and moving the article quickly up and down to cause the base coat and the streaks to further move so as to cause the streaks to become irregular, and then drying and firing the article.

5. The method of decorating enameled ware which comprises dipping the article in vitrifiable enamel of a selected color to form the base coat, flowing separated streams of vitrifiable enamel of a contrasting color over the base coat and allowing the streams to gently settle thereon so as to form separated streaks of a contrasting color in the base coat, oscillating the article by quickly rotating it first in one direction and then the other in order to cause the base coat and the streaks of enamel of a contrasting color to move and moving the article quickly up and down to cause the base coat and the streaks to further move so as to cause the streaks to become irregular, and then drying and firing the article.

WALTER B. MOORE.